UNITED STATES PATENT OFFICE 1,999,955

PRODUCTION OF RESORCINOL AND MIXTURES THEREOF WITH PHENOL

James Irvin Carr and Miles Augustinus Dahlen, Wilmington, Del., assignors to E. I. du Pont de Nemours & Company, Wilmington, Del., a corporation of Delaware No Drawing. Application May 26, 1933, Serial No. 673,101

4 Claims. (Cl. 260—154)

This invention relates to a process for the preparation of resorcinol and mixtures thereof with phenol.

Resorcinol, otherwise known as meta-dihydroxy-benzene, has been manufactured on a commercial scale for many years. Although the processes now used and those which have become obsolete have shown many variations, the fundamental principles and chemical reactions involved have remained substantially unchanged since the early days of manufacture. The operations and reactions which still form the basis for most successful processes start with the sulfonation of benzene with strong sulfuric acid or oleum, the quantity of acid being greatly in excess of that required by theory. The chief product of the reaction is benzene-meta-disulfonic-acid, but important quantities of the ortho and para-isomers and other by-products are likewise formed. The sulfonation mass is diluted with water and neutralized with lime to convert the excess sulfuric acid and the sulfonic acids to the corresponding calcium salts. The calcium sulfate formed is filtered off and the filtrate containing the calcium-benzene-disulfonate is heated with the correct amount of sodium carbonate to convert the calcium salt to the di-sodium salt and precipitate the displaced calcium as calcium carbonate. After the calcium carbonate is separated by filtration, the solution of benzene-disodium-meta-disulfonate is concentrated by evaporation and fused with an excess of caustic soda over the amount required by theory. The principal products of the fusion are the sodium salt of resorcinol and sodium sulfite. The melt is dissolved and treated with an acid such as sulfur dioxide to liberate resorcinol from the sodium salt, and the final operation consists in removal of the resorcinol by a suitable immiscible solvent.

The outstanding disadvantage of the usual procedures is the necessity of using a large excess of sulfonating acid, this excess forming no useful by-product, and greatly complicating the subsequent procedure.

An object of the present invention is to provide a new and improved process for the manufacture of resorcinol. Another object is to avoid the formation of considerable amounts of comparatively useless by-product. A further object is to provide a new outlet for utilizing sulfur dioxide which may occur in large quantities as a by-product of other chemical processes. Other objects will appear hereinafter.

These objects are accomplished by the following invention in which as the first steps in the preparation of resorcinol, benzene is sulfonated to the monosulfonate with sulfur trioxide in a medium of liquid sulfur dioxide and then to the disulfonic-acid stage with sulfur trioxide in the absence of any diluent.

The resultant product is then hydrolyzed directly by reaction with a suitable hydrolyzing agent such as, for example, sodium hydroxide or other alkali metal hydroxide. The resorcinol is readily recovered by any convenient method, for example, by acidifying the reaction product followed by extraction. The resorcinol is obtained in high yield and in a relatively high state of purity.

The following example is illustrative of the preferred procedure for carrying out this invention. All quantities are stated in parts by weight.

Example 1

78 parts of benzene are dissolved in about 200 parts of liquid sulfur dioxide. 83 parts of sulfur trioxide are dissolved in enough liquid sulfur dioxide to make the volume of the solution equal to that of the benzene solution. A suitable sulfonator equipped with an agitator and a means of heating and cooling is charged with about 900 parts of liquid sulfur dioxide. The sulfonator and tanks containing the benzene and sulfur trioxide solutions are closed and the sulfonation is carried out under pressure to prevent the escape of the diluent. An equalizing system is used to maintain the same pressure in the sulfonator and addition tanks.

The solutions of benzene and sulfur trioxide are added to the sulfonator at approximately the same rates, in order that any considerable excess of either reactant is avoided during the monosulfonation of the benzene. The addition of the reactants may be carried out conveniently in four hours, although this factor may be varied over a wide range. During this sulfonation, the temperature is held at 10–35° C.

After the addition of benzene and sulfur trioxide as above described is complete, 83 parts of sulfur trioxide are added. This second portion may or may not be diluted with sulfur dioxide as desired. The sulfur dioxide is then removed from the sulfonation mass by distillation, the solvent being recovered and re-liquefied for use in subsequent sulfonations. The sulfonation mass is finally heated to 100° C. to remove as much as possible of the sulfur dioxide, and to accelerate the disulfonation process. When sulfonation is complete, which may be judged by the disappearance of free sulfur trioxide, the mass is cooled and diluted with three times its weight of water. It is then neutralized by the addition of an equivalent quantity of sodium carbonate. The solution is evaporated to dryness, and the product ground.

The benzene-disodium-disulfonate obtained as above may be converted to resorcinol as follows:

About 750 parts of caustic soda and 15 parts of water are heated in a cast iron pot equipped with an agitator. When the temperature reaches 300° C., the ground disulfonate is slowly added over a period of about one hour, the temperature being maintained at 295-305° C. during this addition. The mass is then heated to 350° C. during about 30 minutes. The melt is cooled and dissolved in water. Sufficient sulfur dioxide gas is added to liberate the resorcinol from the sodium salt. The solid sodium sulfite, which precipitates during this acidification, is removed by filtration. The aqueous filtrate is then extracted with ether.

The ether extract is now distilled. The first fraction, consisting of ether, is returned to the operation for use in further extractions. The second portion consists of water and a little phenol. From this fraction, a small amount of phenol may be recovered if economical. The third fraction, distilled preferably under vacuum, consists of resorcinol. The product thus obtained is of satisfactory quality; and the yield varies from 40 to 60 per cent of theory, based on the benzene used.

As already mentioned in a brief description of the process, and as shown in the foregoing example, the second sulfonic-acid group is introduced by digesting with another mole (usually plus a slight excess) of sulfur trioxide without sulfur dioxide or other diluent. The introduction of this second sulfonic-acid group does not proceed smoothly and completely in a sulfur dioxide medium under practical conditions, hence the sulfur dioxide diluent is removed either before or directly after the addition of the second portion of sulfur trioxide. Essentially, the second sulfonation consists in reacting benzene-mono-sulfonic-acid with sulfur trioxide, as expressed by the following formula:

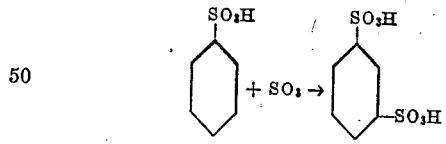

As a modification of this process, less than a molar equivalent of sulfur trioxide may be added to the benzene-mono-sulfonic acid; in which case the final sulfonation product is a mixture of benzene-mono and disulfonic-acids. In this modified procedure, it is advisable, but not always essential to remove the solvent to secure the desired degree of sulfonation.

When a mixture of benzene-sodium-sulfonate and benzene-disodium-disulfonate is hydrolyzed with caustic soda, the product is a mixture of sodium phenate and the sodium salt of resorcinol. A mixture of phenol and resorcinol is obtained on acidifying a melt containing both sodium phenate and the sodium salt of resorcinol.

An example of a detailed procedure which yields a mixture of resorcinol and phenol follows. All quantities are stated in parts by weight.

*Example 2*

A monosulfonation of benzene is carried out as described in Example 1. The sulfur dioxide is then removed by distillation. To the residue, consisting chiefly of benzene-sulfonic-acid, is added 50 parts of sulfur trioxide with suitable cooling. This addition is most suitably carried out at 50-100° C. The mass is then heated slowly to 150° C. and held at that temperature until sulfonation is complete. It is cooled to about 30° C., diluted with an equal volume of water, and neutralized carefully with a 30 per cent solution of sodium hydroxide. The neutralized solution is then evaporated to a thick paste, consisting chiefly of benzene-sodium-sulfonate, benzene-disodium-disulfonate and water.

The fusion pot is charged with 700 parts of caustic soda and 15 parts of water and heated to 300° C. The paste of sulfonates prepared as above is then slowly added, holding the temperature at 300-310° C. The water in the paste is thus removed in the form of steam. When all has been added, the temperature is raised to 340-350° C. in a period of 30 minutes and held at that point for 15 minutes. It is then cooled and diluted with water. The solution is acidified with sulfuric acid, enough acid being used to liberate completely the phenol and resorcinol. The volume of the solution at this point should be large enough to retain in solution all the sodium sulfate produced in the neutralization. This solution is extracted with ether, as in Example 1, and fractionally distilled as before. In this case, the intermediate fraction containing the phenol is quite large, due to the large proportion of monosulfonate obtained in the sulfonation process. By the use of proper distillation equipment, a good separation of phenol and resorcinol may be effected, both products being obtained substantially pure.

In order to minimize the amount of diphenyl sulfone formed in the monosulfonation, it has been found important to follow strictly the mixing procedure described in the examples; that is, dissolve the benzene and sulfur trioxide separately in liquid sulfur dioxide and then add the solutions simultaneously and preferably at an approximately equal rate of flow to a relatively large amount of liquid sulfur dioxide.

Certain of the details given in the foregoing examples, however, may be varied within wide limits without departing from the spirit of the invention. For example, attention is called particularly to the following permissible variations:

In the monosulfonation of benzene the quantity of liquid sulfur dioxide used may be varied within wide limits. Also, the quantity of sulfur trioxide used may be less than, or only equal to that required by theory, in which case benzene will be recovered along with the sulfur dioxide. In order to obtain complete sulfonation a slight excess of sulfur trioxide over that required by theory gives the best results. The temperature at which the monosulfonation may be carried out is subject to considerable variation, as are also the factors of time, rates of addition, dilution of sulfur trioxide and benzene, and amount of stirring.

Part of the disulfonation may be carried out in liquid sulfur dioxide, particularly if the temperature is raised to 50° C. or higher. Such a process is not particularly desirable, however, since the pressure developed makes the operation more difficult; and, after monosulfonation is complete, there is no need for dilution of the benzene-mono-sulfonic-acid-sulfur trioxide reaction mass.

The disulfonation may be completed by heating for varying periods of time at various temperatures. For example, the sulfonation may be completed quite rapidly by raising the temperature to 200° C.

The finished sulfonation mass may be diluted as convenient, and the sulfonic acids may be converted to their potassium instead of sodium salts, if desired.

Hydrolysis of the benzene sulfonates may be accomplished by any of the commonly used processes, or by suitable modifications of such processes. For example, the more or less concentrated solution may be digested with caustic alkali while heating under pressure, or the solution may be evaporated to dryness and the residue fused with caustic soda or potash. The quantity of caustic alkali used for the fusion may be varied within wide limits, but it may be said that the best fusion yields are obtained when a ratio of substantially 2.5 parts of caustic to 1 part of sulfonate are used.

This invention brings about many improvements in the manufacture of resorcinol and, if desired, in the joint manufacture of resorcinal and phenol.

More notable among the advantages are the following:

The disulfonation of benzene is accomplished with very little more than the theoretical quantity of sulfonating agent. In the older processes utilizing sulfuric acid or oleum, a large excess of acid is required. Since sulfur trioxide is the primary product of a modern "contact process" sulfuric acid plant, it is potentially a cheaper sulfonating agent than sulfuric acid. The present process, therefore, presents a double saving in that a lesser quantity of a cheaper sulfonating agent is used.

By the present method it is possible to obtain complete disulfonation at a lower temperature and with a shorter heating period than by the older processes. As a result, the process is more economical to operate; and a higher yield of a better product results due to the reduction of the losses usually resulting from the prolonged heating at a high temperature.

This process avoids the costly "liming out" operation necessary for removal of excess sulfuric acid in the older processes. Since very little unused sulfonating agent is present in the product obtained by our method, it is only necessary to convert the sulfonic-acids to the sodium salts and hydrolyze. The saving in limestone ordinarily used in the liming process, and elimination of several operating steps result in noteworthy economies.

Since no filtrations are necessary in the neutralization step, this operation may be carried out in very concentrated solution, making unnecessary evaporation of the sulfonate solution prior to hydrolyzing.

By selection of the proper ratio of monosulfonic-acid to disulfonic-acid, it is possible to manufacture phenol and resorcinol in any convenient ratio by a single process at a reasonable cost. This eliminates the necessity of duplicating facilities for manufacture of these two products.

As many apparently widely different embodiments of this invention may be made without departing from the spirit and scope thereof, it is to be understood that we do not limit ourselves to the specific embodiments thereof except as defined in the following claims.

We claim:

1. In a process of preparing resorcinol, the steps which comprise monosulfonating benzene with sulfur trioxide in an inert solvent medium, removing the solvent medium, and further sulfonating with additional sulfur trioxide to form benzene-meta-disulfonic-acid.

2. In a process of preparing resorcinol, the steps which comprise monosulfonating benzene with sulfur trioxide in an inert solvent medium, adding an additional amount of sulfur trioxide, removing the inert solvent medium, and further sulfonating to form benzene-meta-disulfonic-acid.

3. In a process of preparing resorcinol the steps which comprise monosulfonating benzene with sulfur trioxide in liquid sulfur dioxide, removing the sulfur dioxide, and further sulfonating with additional sulfur trioxide to form benzene-meta-disulfonic acid.

4. In a process of preparing resorcinol, the steps which comprise monosulfonating benzene by simultaneously adding a solution of benzene in liquid sulfur dioxide and a solution of sulfur trioxide in liquid sulfur dioxide to a relatively large amount of liquid sulfur dioxide, removing the solvent, and further sulfonating with additional sulfur trioxide to form benzene-meta-disulfonic-acid.

JAMES IRVIN CARR.
MILES AUGUSTINUS DAHLEN.